US008629841B2

(12) United States Patent
Degner et al.

(10) Patent No.: US 8,629,841 B2
(45) Date of Patent: Jan. 14, 2014

(54) MULTI-TOUCH SENSOR PATTERNS AND STACK-UPS

(75) Inventors: Brett William Degner, Menlo Park, CA (US); Kenneth Lawrence Staton, San Carlos, CA (US); Steve Porter Hotelling, San Jose, CA (US); Shin John Choi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 871 days.

(21) Appl. No.: 12/242,613

(22) Filed: Sep. 30, 2008

(65) Prior Publication Data

US 2009/0273570 A1    Nov. 5, 2009

Related U.S. Application Data

(60) Provisional application No. 61/049,332, filed on Apr. 30, 2008.

(51) Int. Cl.
*G06F 3/041* (2006.01)
(52) U.S. Cl.
USPC .......................... 345/173; 345/163; 345/174
(58) Field of Classification Search
USPC ................. 345/163–166, 173–178; 200/600; 178/18.01–20.04
See application file for complete search history.

(56) References Cited

U.S. PATENT DOCUMENTS

| | | | | |
|---|---|---|---|---|
| 4,550,221 A | * | 10/1985 | Mabusth | 178/18.06 |
| 4,617,515 A | * | 10/1986 | Taguchi et al. | 178/18.07 |
| 5,016,085 A | * | 5/1991 | Hubbard et al. | 257/700 |
| 5,331,204 A | * | 7/1994 | Kuroda et al. | 257/758 |
| 5,471,090 A | * | 11/1995 | Deutsch et al. | 257/734 |
| 5,483,261 A | | 1/1996 | Yasutake | |
| 5,488,204 A | | 1/1996 | Mead et al. | |
| 5,506,375 A | * | 4/1996 | Kikuchi | 178/18.07 |
| 5,633,479 A | * | 5/1997 | Hirano | 174/255 |

(Continued)

FOREIGN PATENT DOCUMENTS

| | | |
|---|---|---|
| EP | 1 645 951 A2 | 4/2006 |
| EP | 1 645 951 A3 | 4/2006 |

(Continued)

OTHER PUBLICATIONS

International Search Report mailed Jul. 28, 2009, for PCT Application No. PCT/US2009/041849, filed Apr. 27, 2009, four pages.

(Continued)

*Primary Examiner* — Alexander Eisen
*Assistant Examiner* — Sanjiv D Patel
(74) *Attorney, Agent, or Firm* — Morrison & Foerster LLP

(57) ABSTRACT

Capacitive multi-touch sensor panels in which both row and column traces may be formed on a single conducting surface are disclosed. These stack-ups may be made thinner and more flexible allowing them to be particularly well-suited for curved or other non-flat touch sensor panels, such as those that might be present on a mouse or other device designed to be grasped by a user's hand. Curved sensor panel arrays that may be formed from flat substrates are also disclosed. These sensor panel configurations may include channels around the periphery of the array. These channels allow the flat array to lie flat when applied to a curved surface, such as the inside of the curved surface. The pattern of the touch sensor elements may be adjusted across the array to avoid the channels.

29 Claims, 13 Drawing Sheets

(56) References Cited

U.S. PATENT DOCUMENTS

| | | | |
|---|---|---|---|
| 5,650,597 A * | 7/1997 | Redmayne | 178/18.06 |
| 5,682,124 A * | 10/1997 | Suski | 333/1 |
| 5,825,352 A | 10/1998 | Bisset et al. | |
| 5,835,079 A | 11/1998 | Shieh | |
| 5,880,411 A | 3/1999 | Gillespie et al. | |
| 5,933,102 A | 8/1999 | Miller et al. | |
| 5,973,568 A * | 10/1999 | Shapiro et al. | 330/295 |
| 6,002,594 A * | 12/1999 | Ledin et al. | 361/803 |
| 6,147,680 A | 11/2000 | Tareev | |
| 6,188,391 B1 * | 2/2001 | Seely et al. | 345/173 |
| 6,297,811 B1 * | 10/2001 | Kent et al. | 345/173 |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,862,002 B2 * | 3/2005 | Demicco et al. | 343/846 |
| 6,885,316 B2 * | 4/2005 | Mehring | 341/21 |
| 7,015,894 B2 | 3/2006 | Morohoshi | |
| 7,030,860 B1 * | 4/2006 | Hsu et al. | 345/173 |
| 7,046,230 B2 * | 5/2006 | Zadesky et al. | 345/156 |
| 7,184,064 B2 | 2/2007 | Zimmerman et al. | |
| 7,212,189 B2 * | 5/2007 | Shaw et al | 345/163 |
| 7,295,190 B2 * | 11/2007 | Philipp | 345/173 |
| 7,324,095 B2 * | 1/2008 | Sharma | 345/175 |
| 7,466,307 B2 * | 12/2008 | Trent et al. | 345/173 |
| 7,499,036 B2 * | 3/2009 | Flowers | 345/173 |
| 7,580,030 B2 * | 8/2009 | Marten | 345/173 |
| 7,663,607 B2 | 2/2010 | Hotelling et al. | |
| 7,932,898 B2 * | 4/2011 | Philipp et al. | 345/174 |
| 8,479,122 B2 | 7/2013 | Hotelling et al. | |
| 2002/0054467 A1 * | 5/2002 | Tsai et al. | 361/302 |
| 2002/0126951 A1 * | 9/2002 | Sutherland et al. | 385/24 |
| 2003/0037966 A1 | 2/2003 | Sandbach | |
| 2003/0076306 A1 * | 4/2003 | Zadesky et al. | 345/173 |
| 2004/0125087 A1 | 7/2004 | Taylor et al. | |
| 2004/0239650 A1 | 12/2004 | Mackey | |
| 2005/0099392 A1 | 5/2005 | Ishida | |
| 2005/0257628 A1 * | 11/2005 | Nikaido et al. | 73/862.541 |
| 2005/0270273 A1 * | 12/2005 | Marten | 345/173 |
| 2006/0026521 A1 | 2/2006 | Hotelling et al. | |
| 2006/0033722 A1 * | 2/2006 | Chiu et al. | 345/173 |
| 2006/0097991 A1 | 5/2006 | Hotelling et al. | |
| 2006/0114240 A1 * | 6/2006 | Lin | 345/173 |
| 2006/0197750 A1 * | 9/2006 | Kerr et al. | 345/173 |
| 2006/0197753 A1 | 9/2006 | Hotelling | |
| 2006/0274042 A1 * | 12/2006 | Krah et al. | 345/163 |
| 2006/0274055 A1 * | 12/2006 | Reynolds et al. | 345/174 |
| 2007/0182720 A1 * | 8/2007 | Fujii et al. | 345/173 |
| 2007/0229466 A1 | 10/2007 | Peng et al. | |
| 2007/0273560 A1 * | 11/2007 | Hua et al. | 341/33 |
| 2008/0074398 A1 | 3/2008 | Wright | |
| 2008/0170041 A1 * | 7/2008 | Inoue et al. | 345/173 |
| 2008/0277259 A1 * | 11/2008 | Chang | 200/600 |
| 2009/0159344 A1 | 6/2009 | Hotelling et al. | |

FOREIGN PATENT DOCUMENTS

| | | |
|---|---|---|
| EP | 1 912 113 A2 | 4/2008 |
| EP | 1 912 113 A3 | 4/2008 |
| JP | 2000-163031 A | 6/2000 |
| JP | 2002-342033 A | 11/2002 |
| WO | WO-2009/085775 A2 | 7/2009 |
| WO | WO-2009/134727 A1 | 11/2009 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Anonymous. (Oct. 10, 2002). "QMatrix™ Panel Design Guidelines," Quantum Research Application Note AN-KD01, *QRG Ltd.,* four pages.

Final Office Action mailed May 23, 2011, for U.S. Appl. No. 12/038,760, filed Dec. 21, 2007, 12 pages.

International Search Report mailed Oct. 15, 2009, for PCT Application No. PCT/US2008/087037, filed Dec. 16, 2008, four pages.

Non-Final Office Action mailed Feb. 4, 2011, for U.S. Appl. No. 12/038,760, filed Dec. 21, 2007, 13 pages.

Non-Final Office Action mailed Dec. 20, 2011, for U.S. Appl. No. 12/038,760, filed Dec. 21, 2007, 16 pages.

* cited by examiner

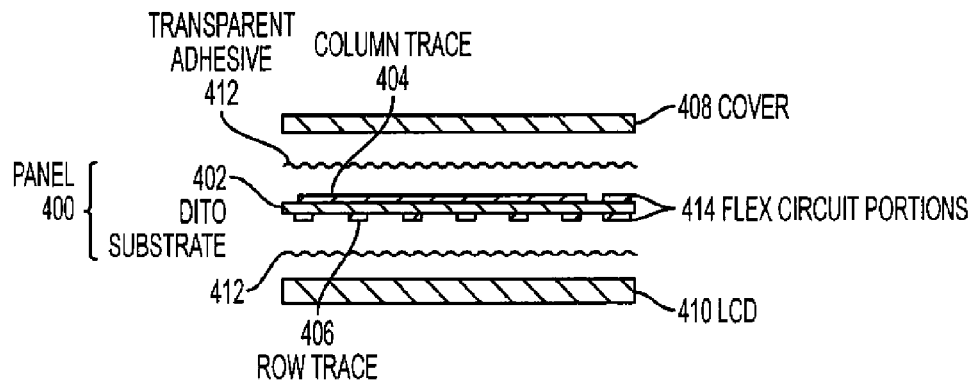
FIG. 4
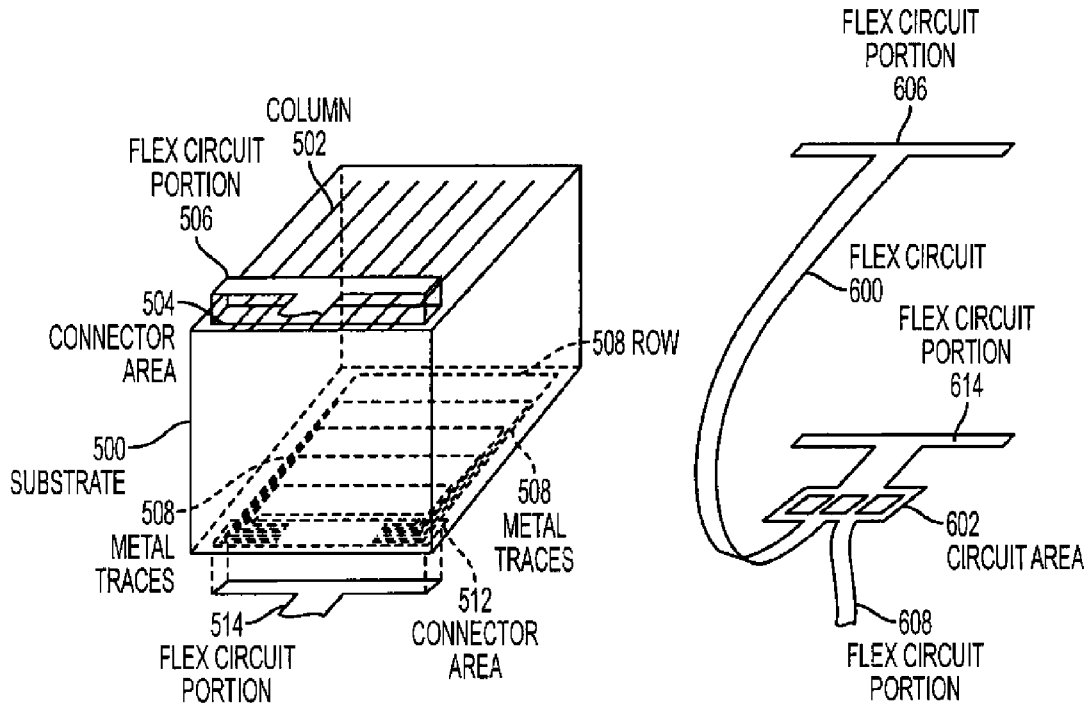
FIG. 5
FIG. 6

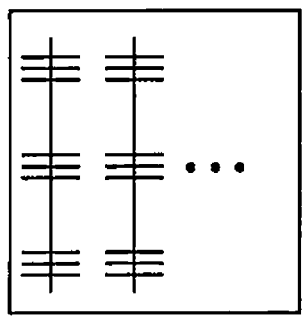
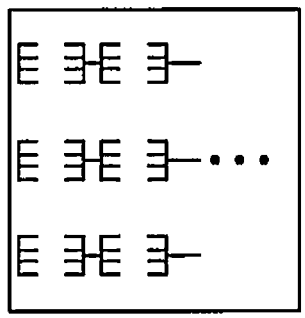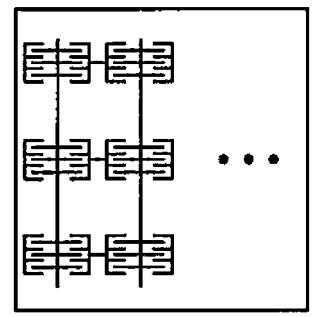
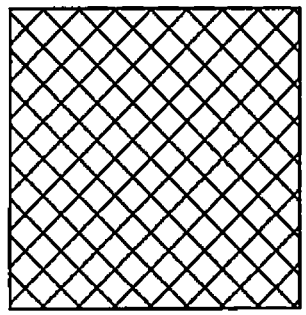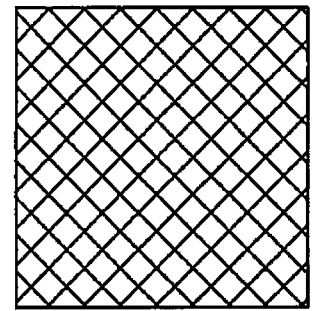
FIG. 7          FIG. 8

MULTI-TOUCH SENSOR PATTERNS AND STACK-UPS

CROSS-REFERENCE TO RELATED APPLICATION

This application claims the benefit of U.S. Provisional Application U.S. Ser. No. 61/049,332, filed Apr. 30, 2008, the entire contents of which are incorporated herein by reference.

FIELD OF THE INVENTION

This invention relates to touch sensor panels, and more particularly, to capacitive multi-touch sensor patterns and stack-ups.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Some touch panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Capacitive touch sensor panels can be formed from rows and columns of traces on opposite sides of a dielectric. At the "intersections" of the traces, where the traces pass above and below each other (but do not make direct electrical contact with each other), the traces essentially form two electrodes. Conventional touch panels for use over display devices have typically utilized a top layer of glass upon which transparent column traces of indium tin oxide (ITO) or antimony tin oxide (ATO) have been etched, and a bottom layer of glass upon which row traces of ITO have been etched. However, the use of transparent traces is not required if the conductors are thin enough (on the order of 30 microns). In addition, if panel transparency is not required (e.g. the touch panel is not being used over a display device), the conductors can be made out of an opaque material such as copper. The top and bottom glass layers are separated by a clear polymer spacer that acts as a dielectric between the row and column traces.

To scan a touch sensor panel, a stimulus can be applied to one row with all other rows held at DC voltage levels. When a row is stimulated, a modulated output signal can be capacitively coupled onto the columns of the touch sensor panel. The columns can be connected to analog channels (also referred to herein as event detection and demodulation circuits). For every row that is stimulated, each analog channel connected to a column generates an output value representative of an amount of change in the modulated output signal due to a touch or hover event occurring at the touch sensor located at the intersection of the stimulated row and the connected column. After analog channel output values are obtained for every column in the touch sensor panel, a new row is stimulated (with all other rows once again held at DC voltage levels), and additional analog channel output values are obtained. When all rows have been stimulated and analog channel output values have been obtained, the touch sensor panel is said to have been "scanned," and a complete "image" of touch or hover can be obtained over the entire touch sensor panel. This image of touch or hover can include an analog channel output value for every pixel (row and column) in the panel, each output value representative of the amount of touch or hover that was detected at that particular location.

SUMMARY OF THE INVENTION

This relates to touch sensor panels, and more particularly, to capacitive multi-touch sensor patterns and stack-ups in which both row and column traces may be formed on a single conducting surface. These stack-ups may be made thinner and more flexible allowing them to be particularly well-suited for curved or other non-flat touch sensor panels, such as those that might be present on a mouse or other device designed to be grasped by a user's hand. This also relates to curved sensor panel arrays that may be formed from flat substrates.

The touch sensor panel may include rows of traces that include a series of perpendicular cross elements that are perpendicular to the direction of the row. The touch sensor panel may also include columns of traces that are in a comb configuration. The comb traces include finger elements that run parallel to the direction of the column. The finger elements are arranged between the perpendicular cross elements of the row traces. The interlocking fingers of the row and column traces can increase the amount of capacitance and the electric fields as compared to typical trace configurations.

The column and row traces may be formed on different layers. However, in some touch sensor arrangements it may be desirable to decrease the thickness of the touch sensor array in the z direction. This may be accomplished by consolidating layers of the touch sensor. The column and row traces may be located on the same layer except where they intersect. At these intersection points a via may be used that route either the column or row trace to the layer below. If the layer below includes the ground plane, a hole in the ground plane can be made at the location of the intersection to prevent the trace coming down from contacting the ground plane.

A thinner touch sensor configuration allows the touch sensor to be made more pliable. This allows the touch sensor to conform to other mechanical pieces in an electronic device. For example, the touch sensor can be made to conform to non planar/curved surfaces.

Touch sensor arrays are typically made in a flat layered configuration. Applying a typical flat array configuration to a curved surface may cause problems such as wrinkling, buckling, or snapping. Further, if the array contains many layers, it may be difficult to bend to apply to the curved surface. Accordingly, flat touch sensor panel configurations that may be formed around a curved surface are described.

The sensor panel configurations may include channels around the periphery of the array. These channels allow the flat array to lie flat when applied to a curved surface, such as the inside of the curved surface. The pattern of the touch sensor elements may be adjusted across the array to avoid the channels.

BRIEF DESCRIPTION OF THE DRAWINGS

FIG. 4 illustrates an exemplary capacitive touch sensor panel fabricated using a double-sided ITO (DITO) substrate having column and row ITO traces formed on either side of the substrate, and bonded between a cover and an LCD using transparent adhesive according to some embodiments of this invention.

FIG. 5 is an exploded perspective view of an exemplary DITO substrate (with its thickness greatly exaggerated for purposes of illustration only) with columns and rows formed on either side according to some embodiments of this invention.

FIG. 6 illustrates an exemplary flex circuit according to some embodiments of this invention, including flex circuit portions for connecting to the row and column traces, respectively, on either side of a DITO substrate, and a flex circuit portion for connecting to a host processor.

FIG. 7 illustrates an exemplary three conducting layer touch sensor array configuration according to some embodiments of this invention.

FIG. 8 illustrates an exemplary two layer touch sensor configuration including a layer with both column and row touch sensor traces and a ground plane layer.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

This relates to touch sensor panels, and more particularly, to capacitive multi-touch sensor patterns and stack-ups in which both row and column traces may be formed on a single conducting surface. These stack-ups may be made thinner and more flexible allowing them to be particularly well-suited for curved or other non-flat touch sensor panels, such as those that might be present on a mouse or other device designed to be grasped by a user's hand. This also relates to curved sensor panel arrays that may be formed from flat substrates.

Figure 1:
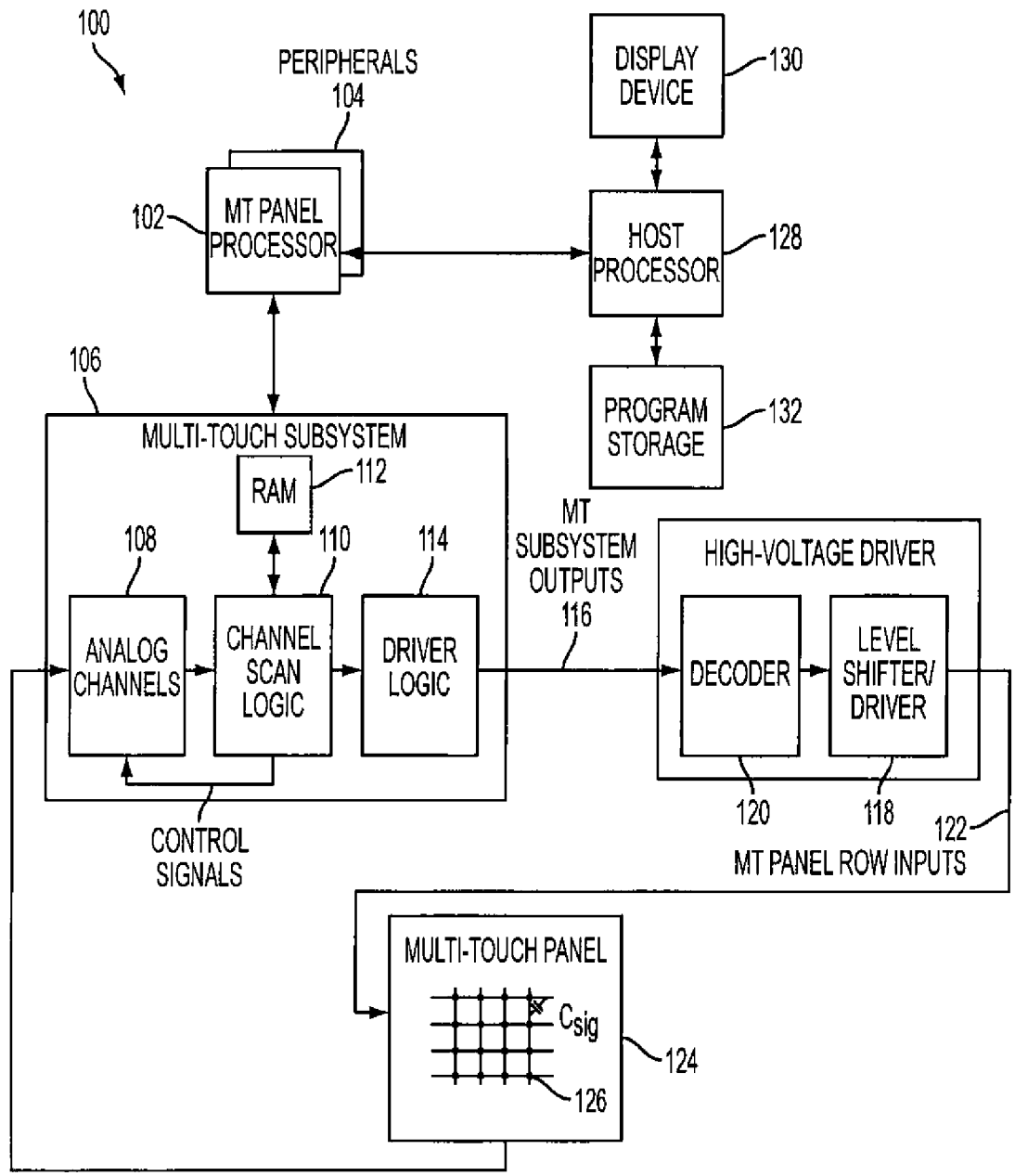
FIG. 1 illustrates an exemplary computing system operable with a capacitive multi-touch sensor panel according to some embodiments of this invention.

Multi-touch sensor panels and their associated touch sensor panel circuitry may be able to detect multiple touches (touch events or contact points) that occur at about the same time, and identify and track their locations. FIG. 1 illustrates exemplary computing system 100 operable with capacitive multi-touch sensor panel 124 according to embodiments of this invention. Multi-touch sensor panel 124 can be created using a substrate with column and row traces formed on either side of the substrate using a novel fabrication process. Flex circuits can be used to connect the column and row traces on either side of the touch sensor panel to its associated touch sensor panel circuitry. Traces made of copper or other highly conductive metals running along the edge of the substrate can be used to bring the row traces to the same edge of the substrate as the column traces so that the flex circuits can be bonded to the same edge of the substrate on directly opposing sides of the substrate, minimizing the area needed for connectivity and reducing the overall size of the touch sensor panel. A single flex circuit can be fabricated to connect to the rows and columns on directly opposing sides at the same edge of the substrate. Furthermore, the row traces can be widened to shield the column traces from a modulated Vcom layer.

Computing system 100 can include one or more panel processors 102 and peripherals 104, and panel subsystem 106. The one or more processors 102 can include, for example, an ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and panel 124. Each panel row input 122 can drive one or more rows in panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

As mentioned above, multi-touch panel 124 can in some embodiments include a capacitive sensing medium having a plurality of row traces or driving lines and a plurality of column traces or sensing lines (although other sensing media may also be used) separated by a dielectric. In some embodiments, the dielectric material can be transparent, such as glass, or can be formed from other materials such as Mylar, Polyimide, and other PCB materials. The row and column traces can be formed from a transparent conductive medium such as ITO or ATO, although other transparent or non-transparent materials such as copper or conductive ink can also be used. In some embodiments, the row and column traces can be perpendicular to each other, although in other embodiments other non-orthogonal and non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as may be used herein are intended to encompass not only orthogonal grids, but the intersecting traces of other geometric configurations having first and second dimensions (e.g. the concentric and radial lines of a polar-coordinate arrangement).

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Figure 2A:
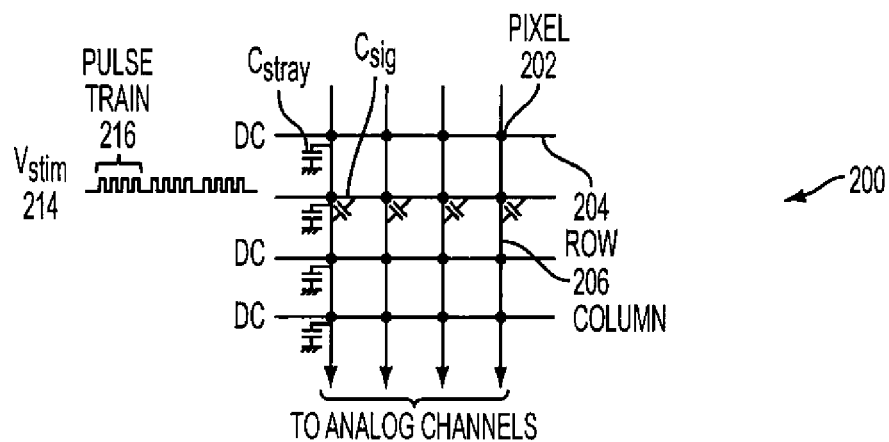
FIG. 2a illustrates an exemplary capacitive multi-touch panel according to some embodiments of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
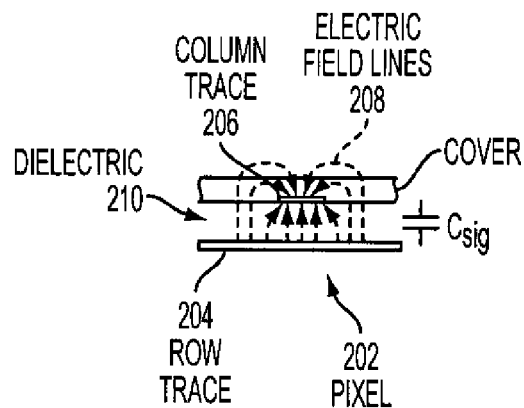
FIG. 2b is a side view of exemplary pixel in a steady-state (no-touch) condition according to some embodiments of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
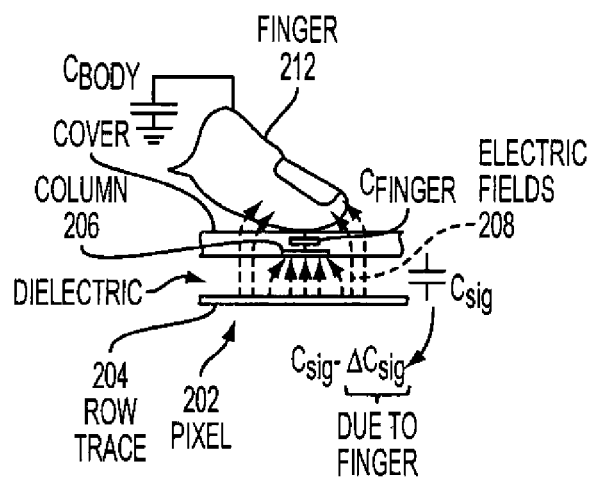
FIG. 2c is a side view of exemplary pixel in a dynamic (touch) condition according to some embodiments of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the static (no touch) component and ΔCsig represents the dynamic (touch) component. Note that Csig-ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can be generated as one or more pulse trains 216 at a particular frequency, with each pulse train including a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel can be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

As described above, because the rows may be either stimulated with an AC signal or held at a DC voltage level, and because the columns need to be connected to analog channels so that modulated output signals can be detected, demodulated and converted to output values, electrical connections must be formed with the rows and columns on either side of the dielectric of the touch sensor panel.

Figure 3:
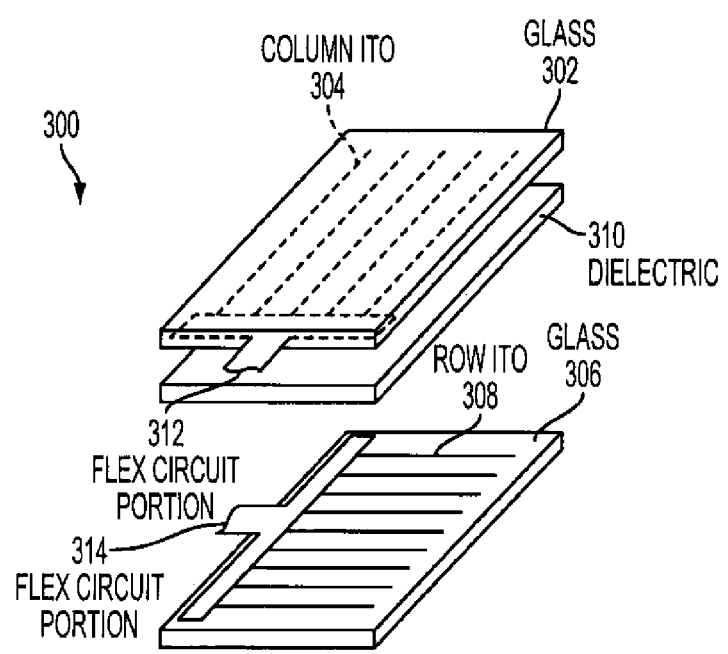
FIG. 3 is an exploded perspective view of an exemplary capacitive touch sensor panel formed from a top layer of glass upon which transparent column traces of ITO have been etched, and a bottom layer of glass upon which row traces of ITO have been etched.

FIG. 3 is an exploded perspective view of an exemplary capacitive touch sensor panel 300 formed from a top layer of glass 302 upon which transparent column traces of ITO 304 have been etched, and a bottom layer of glass 306 upon which row traces of ITO 308 have been etched. The top and bottom glass layers 302 and 306 are separated by a clear polymer spacer 310 that acts as a dielectric between the row and column traces. Because the rows and columns are perpendicular to each other, the most straightforward way to connect to these rows and columns is to bond flex circuit 312 at one edge of the touch sensor panel, and bond another flex circuit 314 on an adjacent edge of the touch sensor panel. However, because the connection areas for these flex circuits 312 and 314 are not on the same edge of touch sensor panel 300 and are not on directly opposing sides of dielectric 310, the touch sensor panel must be made larger to accommodate these two non-overlapping connection areas.

Capacitive touch sensor panels typically form the row and column traces on two pieces of glass as shown in FIG. 3 because it has not been practical to form column and row traces on either side of a single substrate. Conventional methods for forming ITO traces on one side of a substrate require that the substrate be placed on rollers during the fabrication process. However, if the substrate is then flipped over to form ITO traces on the second side, the rollers will damage any traces previously formed on the first side of the substrate. Furthermore, when etching is used to etch away part of the ITO to form traces on one side of the substrate, the entire substrate is conventionally placed in an etching bath, which will etch away any traces previously formed on the other side of the substrate.

FIG. 4 illustrates an exemplary capacitive touch sensor panel 400 fabricated using a double-sided ITO (DITO) substrate 402 having column and row ITO traces 404 and 406, respectively, formed on either side of the substrate, and bonded between cover 408 and LCD 410 using transparent adhesive 412 according to embodiments of this invention. Substrate 402 can be formed from glass, plastic, hybrid glass/plastic materials, and the like. Cover 408 can be formed from glass, acrylic, sapphire, and the like. To connect to column and row traces 404 and 406, respectively, two flex circuit portions 414 can be bonded to directly opposing sides at the same edge of DITO 402, although other bonding locations may also be employed.

FIG. 5 is an exploded perspective view of an exemplary DITO substrate 500 (with its thickness greatly exaggerated for purposes of illustration only) with columns 502 and rows 508 formed on either side according to embodiments of this invention. Some of column ITO traces 502 on the top side are routed to a necked-down connector area 504, where they are brought off the panel by a flex circuit portion 506 that can be conductively bonded to the top of DITO substrate 500. In some embodiments, row ITO traces 508 on the bottom side can be connected to thin metal traces 510 that run alongside the edges of the bottom side. Metal traces 510 can be routed to connector area 512, which can be directly opposing connector area 504, or at least on the same edge of DITO substrate 500 as connector area 504. Providing connector areas 504 and 512 at the same edge of DITO substrate 500 can allow the substrate and therefore the product to be smaller. Another flex circuit portion 514 can be used to bring row ITO traces 508 off the panel.

Column and row ITO traces 502 and 508 can be formed on both sides of DITO substrate 500 using several fabrication methods. In one embodiment, a substrate can be placed on the rollers of the fabrication machinery and a layer of ITO can be sputtered onto a first side of DITO substrate 500 and etched (e.g. using photolithography techniques) to form column traces 502. A protective coating of photoresist (e.g. two layers of photoresist) can then be applied over the column traces 502, and DITO substrate 500 can be flipped over so that the rollers make contact only with the applied photoresist on the first side and not the formed column traces. Another layer of ITO can then be sputtered onto the now-exposed back side of DITO substrate 500 and etched to form row traces 508.

If no metal traces 510 are required, the photoresist on the first side can be stripped off to complete the process. However, if metal traces 510 are required at the edges to connect to row traces 508 and bring them to a particular edge of the substrate, a protective coating of photoresist (e.g. two layers of photoresist) can be applied over row traces 508, leaving the edges exposed. A metal layer can then be sputtered over the photoresist and exposed edges, and the metal layer can then be etched to form metal traces 510 at the edges. Finally, all remaining layers of photoresist can be stripped off.

Minor variations to the process described above can also be made. For example, the second side of the DITO substrate patterning may be formed by first patterning a photoresist using very simple geometry to cover only the interior region of the second side of the DITO substrate while leaving the edge regions exposed. For this variation, metal is sputtered first and then the photoresist with simple geometry is then stripped off to leave metal in the edge regions only. Then the ITO is sputtered over the entire second side of the DITO substrate. A second photoresist is applied and patterned to form the mask for the electrode patterns. A series of etching steps is then used to form the electrode pattern in the topmost ITO layer and metal layer underneath. The first etching steps etches the ITO only, and the second etch steps etches the metal layer only which produces the desired electrode geometry.

FIG. 6 illustrates an exemplary flex circuit 600 according to embodiments of this invention, including flex circuit portions 606 and 614 for connecting to the row and column traces, respectively, on either side of a DITO substrate, and flex circuit portion 608 for connecting to a host processor. Flex circuit 600 includes a circuit area 602 upon which the multi-touch subsystem, multi-touch panel processor, the high voltage driver and decoder circuitry (see FIG. 1), an EEPROM and some essential small components such as bypass capacitors can be mounted and connected to save space. Circuit area 602 may be shielded by an EMI can (not shown) which encloses circuit area 602 using top and bottom shield portions. The bottom can may be adhered to a structure of the device to secure the circuit area. From this circuit area 602, flex circuit 600 may connect to the top of the DITO substrate via flex circuit portion 606, to the bottom of the DITO substrate via flex circuit portion 614, and to a host processor via flex circuit portion 608.

FIGS. 7(a), 7(b) and 7(c) illustrate an exemplary three conducting layer touch sensor array configuration according to some embodiments of this invention. The three conducting layers shown in FIGS. 7(a), 7(b) and 7(c) can each be separated by, for example, a dielectric substrate. The first conducting layer shown in FIG. 7(a) may include rows of traces. The rows of traces may include a series of perpendicular cross elements that are perpendicular to the direction of the row. The second conducting layer as shown in FIG. 7(b) may include columns of traces that are in a comb configuration. The comb traces include finger elements that run parallel to the direction of the column. The finger elements are arranged between the perpendicular cross elements of the row traces.

As shown in FIG. 7(b), the comb traces may be arranged so that the fingers on one comb trace extend toward the fingers of another neighboring comb trace. The interlocking fingers in the first conducting layer and the second conducting layer can increase the amount of capacitance and the electric fields as compared to typical trace configurations. Note that it will be appreciated that what is labeled as a row trace and what is labeled as a column trace may be switched simply by rotating the substrate.

The third layer shown in FIG. 7(c) is a dedicated ground plane. The ground plane may be used to shield the touch sensor layers from other aggressors, for example, routing lines and other connections and components. For example, without the ground layer mutual capacitance between a routing line and one of the rows or columns may occur and generate additional undesirable mutual capacitance. The ground layer may also prevent or minimize interference from objects on the side of the touch sensor array opposite the side configured to be sensed. This may particularly be a problem if there is relative movement between these objects and the touch sensor array.

Additional layers, for example, routing layers and component layers may be located under the ground plane.

The conducting layers may, for example, be etched, deposited, printed or placed on a variety of substrates. These substrates may include, for example, fiberglass, glass, or plastic (including Polyethylene terephthalate (PET), polyimide, and FR4) substrates. In one embodiment, the conducting traces may be deposited on a PET layer utilizing conducting ink. The thickness of these substrates may range, for example, from 0.025 mm-5 mm.

In some touch sensor arrangements it may be desirable to decrease the thickness of the touch sensor array in the z direction. This may be accomplished by consolidating layers of the touch sensor. The column and row traces may be located on the same layer except where they intersect. At these intersection points a via may be used that route either the column or row trace to the layer below. A via can then be used to via back up after the intersection. If the layer below includes the ground plane, a hole in the ground plane can be made at the location of the intersection to prevent the trace coming down from contacting the ground plane.

FIGS. 8(a) and 8(b) illustrate an exemplary two layer touch sensor configuration including a layer shown in FIG. 8(a) with both column and row touch sensor traces and a ground plane layer shown in FIG. 8(b). Vias are located in the center of the comb patterns to route one of the trace patterns under the other trace pattern.

Figure 9:
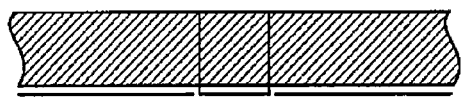
FIG. 9 illustrates an exemplary cross section view of the two layer touch sensor configuration shown in FIG. 8 according to some embodiments of this invention.

FIG. 9 illustrates an exemplary cross section view of the two layer touch sensor configuration shown in FIGS. 8(a) and 8(b) according to some embodiments of this invention. FIG. 9 shows that at the intersection point for the two touch sensor trace patterns, one of the traces is routed to another layer using a via. In some embodiments, the trace may be routed to a ground plane. The ground plane may have a hole at the intersection point where the trace is routed. This configuration allows for a full capacitive touch sensor to be made using two layers instead of three. In addition, the distance from the trace wire to the ground layer may be prioritized, allowing for a greater separation between layers using the same z thickness.

By forming the sense and drive touch sensor traces on the same layer, the sense and drive patterns may be aligned to one another more precisely. For example, these traces can be formed at the same time allowing for precise reference between them.

A thinner touch sensor configuration also allows the touch sensor to be made more pliable. This allows the touch sensor to conform to other mechanical pieces in an electronic device. For example, the touch sensor can be made to conform to non planar/curved surfaces.

Figure 10:
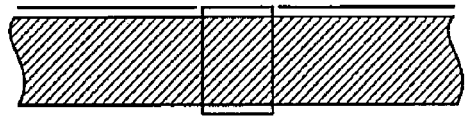
FIG. 10 illustrates an exemplary two layer touch sensor configuration without a ground plane according to some embodiments of this invention.

FIG. 10 illustrates an exemplary two layer touch sensor configuration without a ground plane according to some embodiments of this invention. In FIG. 10, the second layer only includes traces at the intersection point.

Figure 11:
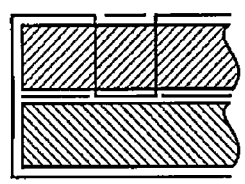
FIG. 11 illustrates an exemplary three layer touch sensor configuration that includes a routing layer according to some embodiments of this invention.

FIG. 11 illustrates an exemplary three layer touch sensor configuration that includes a routing layer according to some embodiments of this invention. In FIG. 11 vias are located on an edge of the substrate and connect the touch sensor layer to a routing layer below the ground plane. In addition to having vias at the edge of the substrate, one or more vias can also be located throughout internal portions of the substrate layer and can via down through the ground plane to the routing layer.

Figure 12:
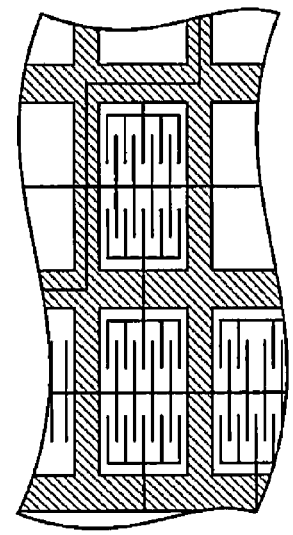
FIG. 12 illustrates an exemplary touch sensor configuration that includes a webbed ground plane according to some embodiments of this invention.

FIG. 12 illustrates an exemplary touch sensor configuration that includes a webbed ground plane according to some embodiments of this invention. The view in FIG. 12 shows an overhead view of three layers. The first layer includes the sense and drive traces, the second layer includes the webbed ground plane and may include traces that have via'd down from the first layer at the intersection points. The third layer may be a routing layer. The routing may be configured to follow the webbed ground plane so that the ground plane can shield the touch sensor traces from the routing.

By webbing the ground plane, the thickness of the layers may be further reduced. The ground plane may reduce signal capacitance the closer it gets to the layers that include the touch sensor traces. Accordingly, to achieve sufficient signal capacitance using the ground plane the dielectric thickness between these layers may need to be kept sufficiently large, for example, to 200 microns plus or minus 20 microns.

By webbing the ground plane, with for example 20% coverage area versus a full 100% coverage area, the effect of the ground plane can be reduced. The thickness of the dielectric layer and the tolerance for this layer may then be reduced to, for example, 100 microns plus or minus 20 microns.

The ground plane may be webbed in such a way that each touch pixel corresponds with one web so each touch pixel sees effectively the same amount of ground. Signal routing may be located beneath the webbed ground layer so as to be shielded by the ground webbing.

Figure 13:
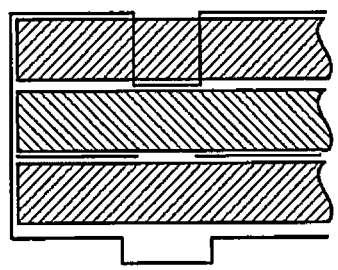
FIG. 13 illustrates an exemplary four layer touch sensor configuration including a layer including an integrated circuit or other digital component according to some embodiments of this invention.

FIG. 13 illustrates an exemplary four layer touch sensor configuration with a layer including an integrated circuit or other digital component according to some embodiments of this invention. In FIG. 13, the first layer includes a the touch sensor trace patterns, the second layer includes crossovers at the intersection of the touch sensor trace patterns, the third layer includes the ground plane and the fourth layer includes the routing and may include an integrated circuit or other digital component.

Figure 14:
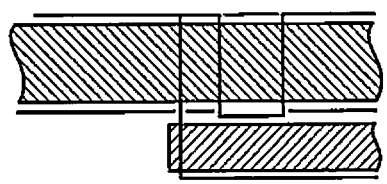
FIG. 14 illustrates an exemplary terraced three layer touch sensor array configuration in which the second substrate layer is smaller than the first substrate layer according to some embodiments of this invention.

FIG. 14 illustrates an exemplary terraced three layer touch sensor array configuration in which the second substrate layer is shorter than the first substrate layer according to some embodiments of this invention. This configuration allows for a dedicated routing layer that is smaller than total size of the touch sensor array. The terraced configuration allows the device to be stiffer than a configuration using only a single substrate layer while utilizing less space than a typical two substrate layer configuration. In addition, the terraced configuration provides a lip that may be used to lock the touch sensor array into a position on a device.

Figure 15:
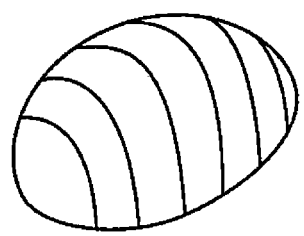
FIG. 15 illustrates an exemplary curved surface for a touch sensor array according to some embodiments of this invention.

Touch sensor arrays are typically made in a flat layered configuration. Applying a typical flat array configuration to a curved surface may cause problems. FIG. 15 illustrates an exemplary curved surface for a touch sensor array according to embodiments of this invention. A typical flex circuit touch sensor array applied to the inside of this surface would tend to wrinkle, buckle, or may snap. Further, if the array contains many layers, it may be difficult to bend to apply to the curved surface. Accordingly, a two layer one piece flat touch sensor array that may be utilized on a curved surface is shown in FIGS. 16A and 16B.

Figure 16A:
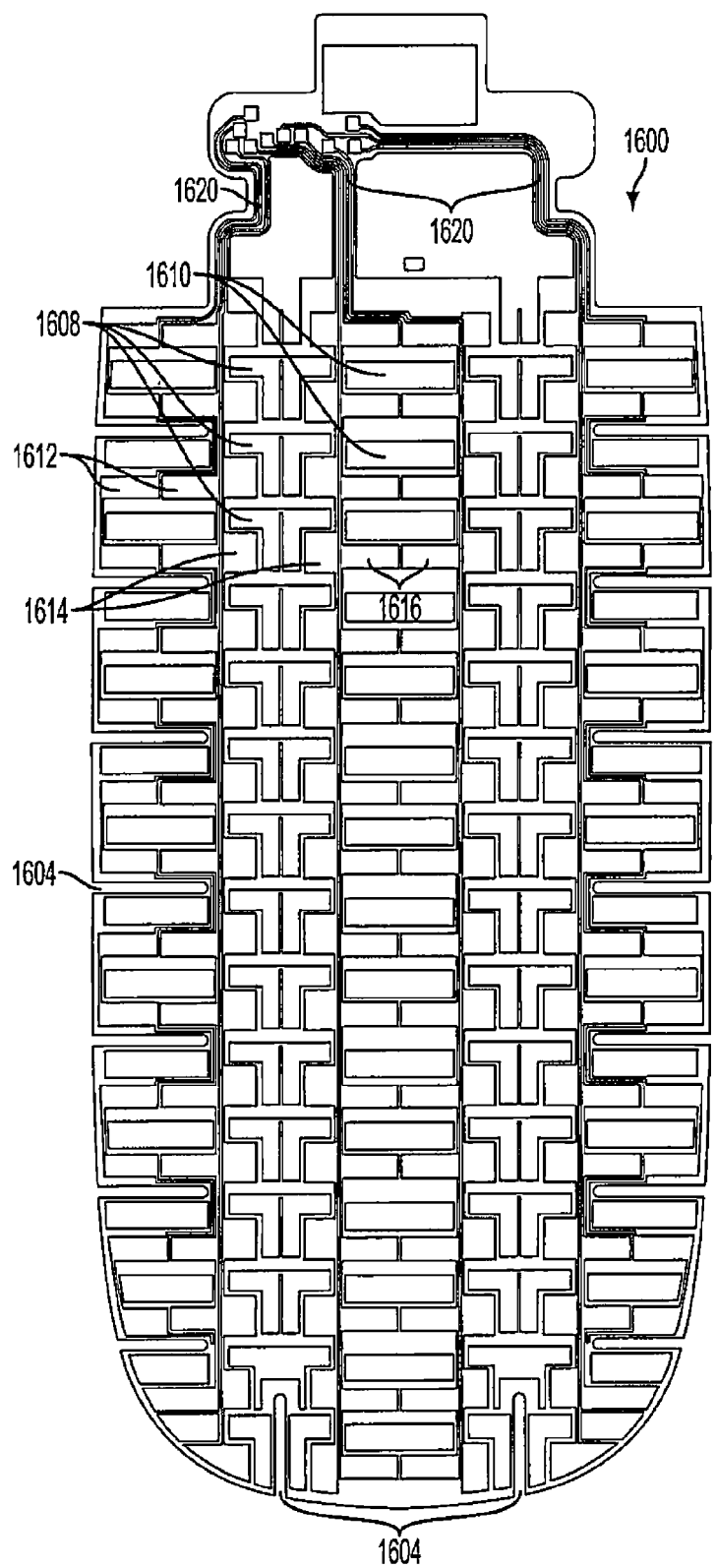
FIG. 16A illustrates an exemplary first conducting layer of a touch sensor array that may be adhered to a curved surface according to some embodiments of this invention.

FIG. 16A is an embodiment of a first conducting layer 1600 of a touch sensor array that may be adhered to a curved surface. FIG. 16B is an embodiment of a second conducting layer 1602 of the touch sensor array that may be adhered to a curved surface.

Figure 16B:
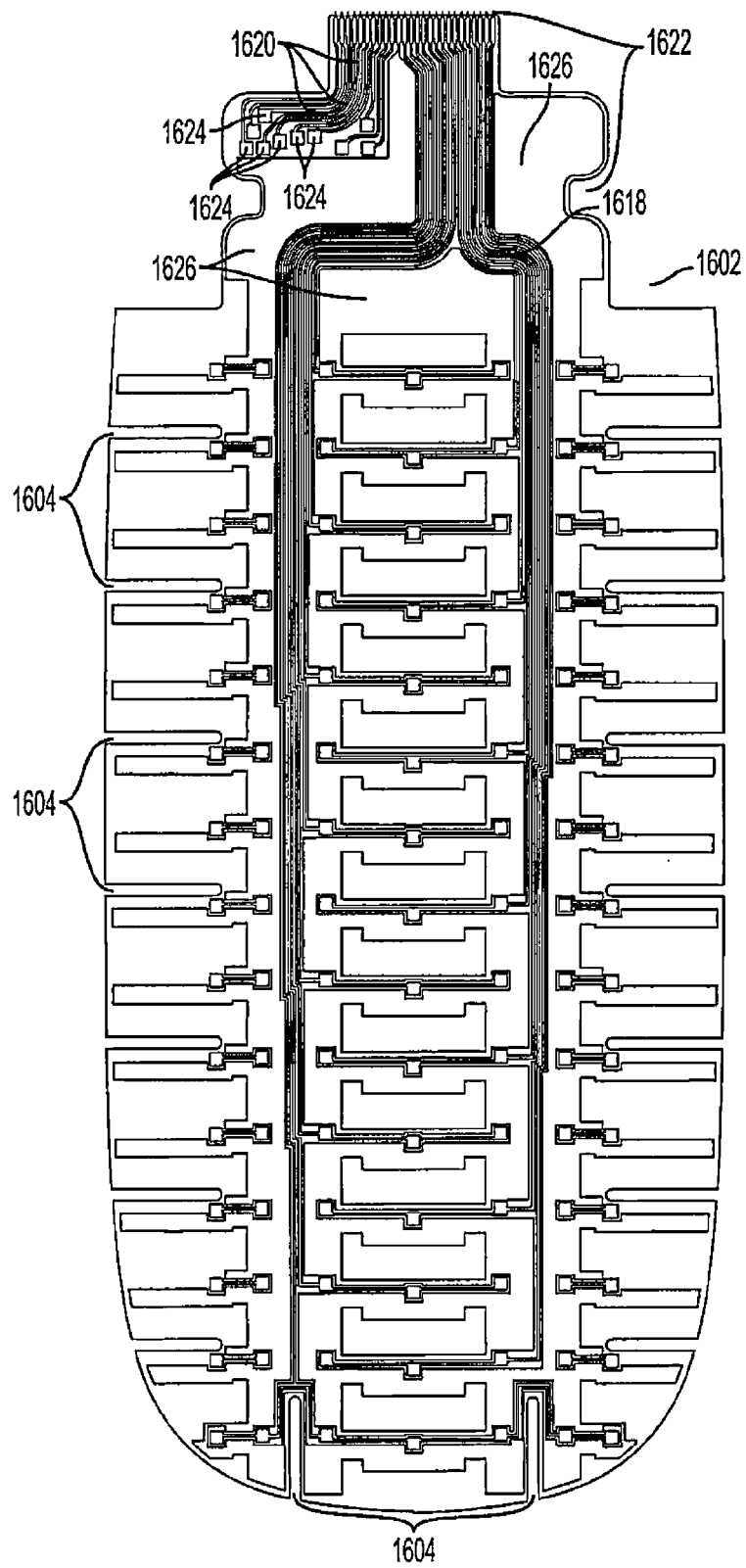
FIG. 16B illustrates an exemplary second conducting layer of a touch sensor array that may be adhered to a curved surface according to some embodiments of this invention.

The touch sensor array shown in FIGS. 16A and 16B includes channels 1604 around the periphery of the array. These channels allow the flat array to lie flat when applied to a curved surface, such as the inside of the curved surface shown in FIG. 15. When applied to such a surface, channels 1604 around the sides of the array come together a little and channels 1604 around the bottom middle of the array spread out a little. This allows the array to lay more flat than a typical array and may prevent air bubbles and non-continuities from forming between the curved substrate and the array.

The touch sensor pattern shown in FIG. 16A includes touch sensor row elements 1606, 1608, and 1610. The touch sensor pattern also includes touch sensor columns elements 1612, 1614, and 1616. Instead of a typical touch sensor array in which all the touch sensor row elements are the same and all the touch sensor column elements are the same, the patterns of touch sensor row elements 1606, 1608, and 1610 are adjusted across the array to avoid the channels 1604, to allow column traces 1620 to run through the array on first conducting layer 1600, and to shield the array from row traces 1618 that appear on second conducting layer 1602.

The column traces 1620 are routed on the first conducting layer 1600 around the touch sensor rows elements 1606, 1608, and 1610. The row traces 1618 are routed on second conducting layer 1602. A ground plane 1626 surrounds row traces 1618 on second conducting layer 1602.

The configuration of the touch sensor row elements 1608 allows for the routing 1618 of the rows to be inside the active region of the touch sensor array. This is because the L shaped of the touch sensor row elements 1608 are over and cover up the row traces 1618, and the touch sensor column elements 1612, 1614, 1616, do not cross over the row traces 1618. When touch sensor elements cross over the traces, capacitive coupling between the elements and the traces can occur. This coupling may decrease the performance of the array if it is between row elements and column elements or between column elements and row elements. However, it is acceptable to have capacitance coupling between the row elements and the row traces and column elements and column traces.

Second touch sensor layer 1602 includes a tale tail portion 1622 that includes both the row traces 1618 and column traces 1620. The column traces 1620 have been via'd down from the first conducting layer 1600 at pads 1624. This tail portion 1622 can be connected to systems for controlling and monitoring the touch sensor array.

Figure 17:
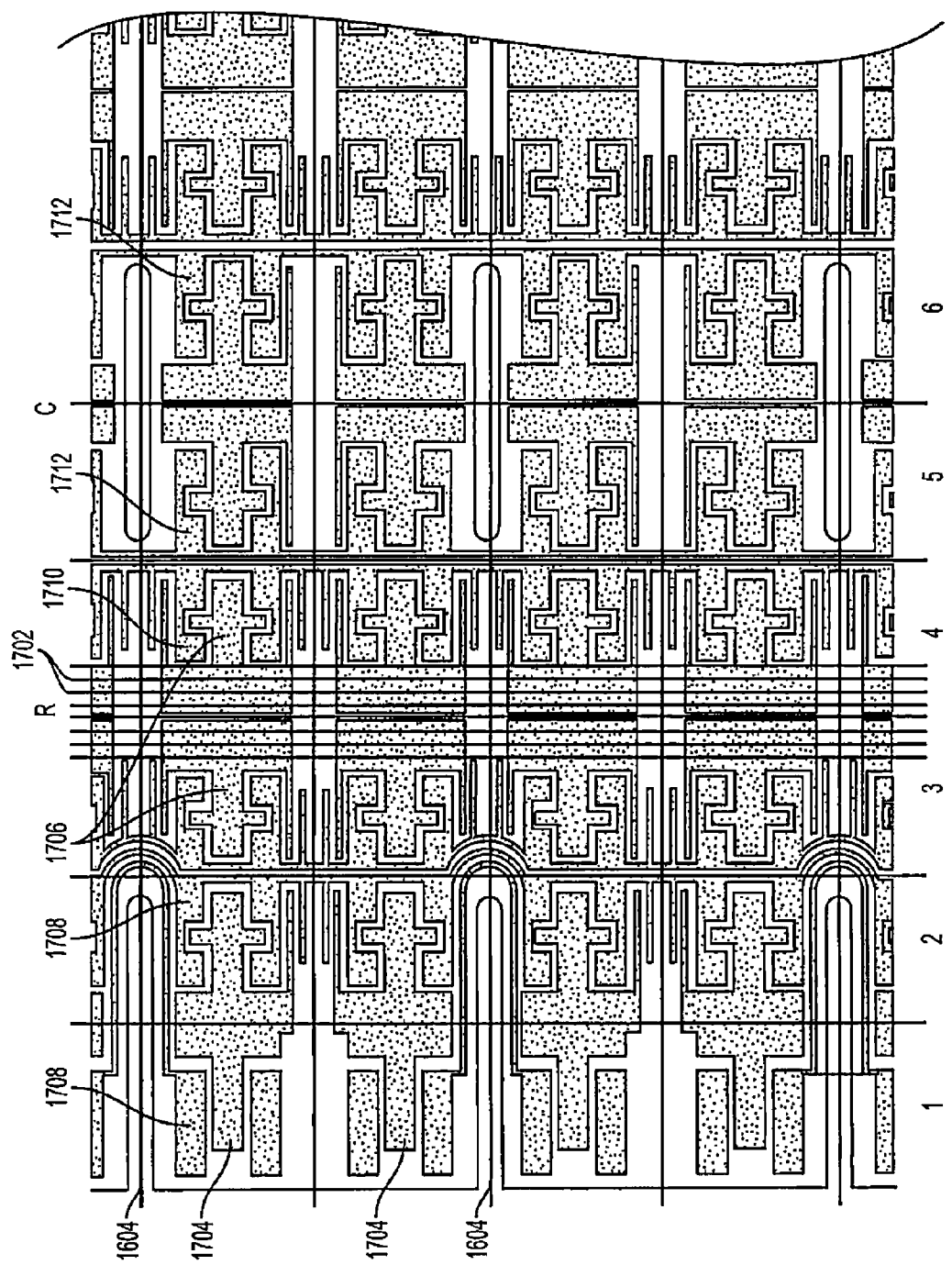
FIG. 17 is a detailed view of an exemplary first conducting layer superimposed over second conducting layer of a touch sensor array according to some embodiments of this invention

FIG. 17 shows a more detailed view of first conducting layer 1600 superimposed over second conducting layer 1602. As shown in FIG. 17, row traces 1618 are located under row elements 1618 and row traces 1618 do not cross under column elements 1612, 1614, and 1616. In FIG. 17, C marks the center line of symmetry of the touch sensor element pattern, and R marks the routing channel line of symmetry. The shape of the row elements 1606 and column elements 1612 in rows 1 and 2 are different to allow for routing around channels 1604.

Figure 18:
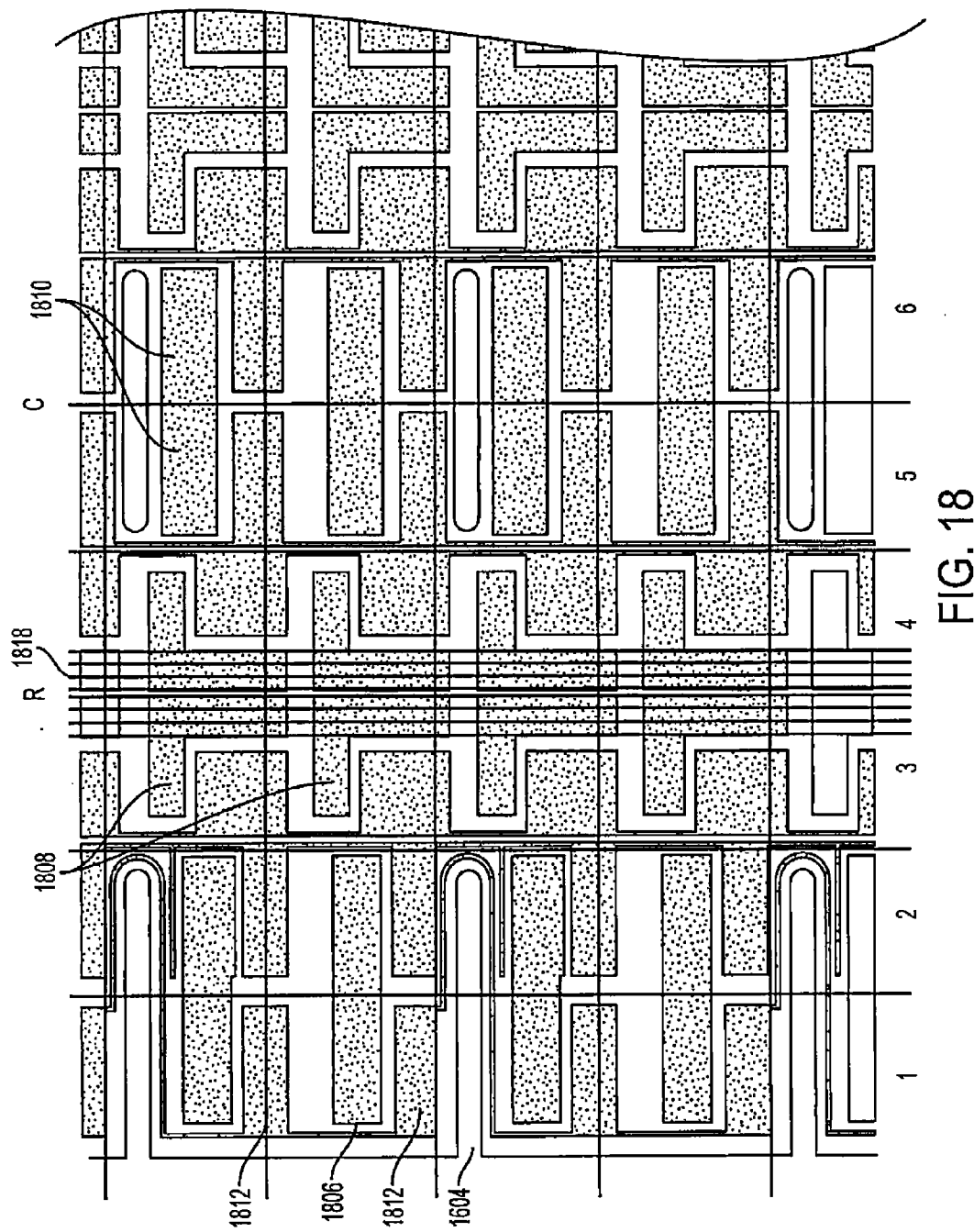
FIG. 18 illustrates an exemplary touch sensor array configuration according to some embodiments of this invention.

FIG. 18 is another embodiment of a touch sensor array pattern. In FIG. 18, row traces 1702 are located under row elements 1706 and row traces 1702 do not cross under column elements 1708, 1710, 1712. In FIG. 17, C marks the center line of symmetry of the touch sensor element pattern, and R marks the routing channel line of symmetry. The shape of the row elements 1704, in column 1 have been adjusted to allow routing around channels 1604. The shape of the cross shaped portion of the row elements 1704 and 1706 may be adjusted to fine tune capacitance.

FIGS. 19A, 19B, 19C, and 20, show alternative touch sensor array configurations that may be configured for use on curved surfaces.

Figure 19A:
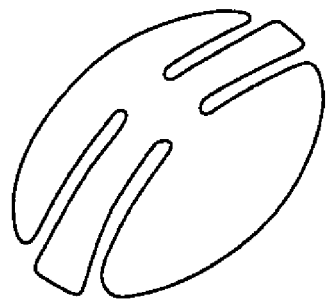
FIG. 19A illustrates an exemplary "butterfly" pattern for a touch sensor array according to some embodiments of this invention.

FIG. 19A illustrates an exemplary "butterfly" pattern for a touch sensor array according to some embodiments of this invention. The butterfly pattern may include a substrate including one or more channels that separate portions of the substrate. The channels do not run the full length of the substrate and the substrate portions are connected to one another at an interior location of the substrate portions. The channels allow a flat touch sensor array to be formed around a curved surface curved surface without wrinkling.

Figure 19B:
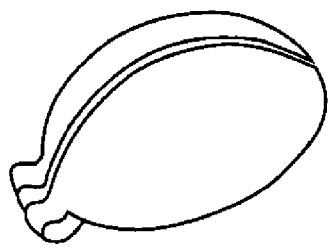
FIG. 19B illustrates an exemplary two strip touch sensor array pattern according to some embodiments of this invention.
Figure 19C:
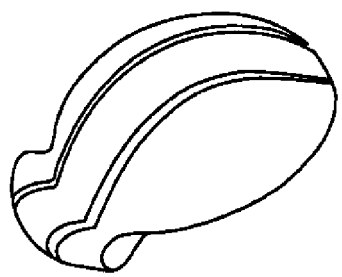
FIG. 19C illustrates an exemplary three strip touch sensor array pattern according to some embodiments of this invention.

FIG. 19B illustrates an exemplary two strip touch sensor array pattern according to some embodiments of this invention. The two strips may be electrically connected but may be formed on different substrate strips. FIG. 19C illustrates an exemplary three strip touch sensor array pattern according to some embodiments of this invention. The three strips may be electrically connected but may be formed on different substrate strips. These patterns can also be formed from a flat array and can be applied to a curved surface.

Figure 20:
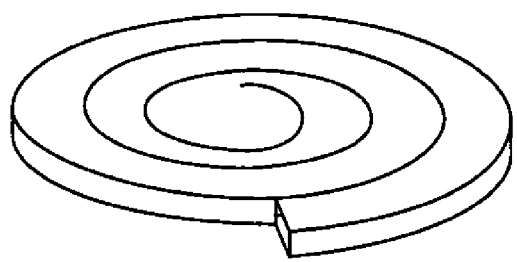
FIG. 20 illustrates an exemplary flat touch sensor pattern in a "snail" pattern that can be applied to a curved surface according to some embodiments of this invention.

FIG. 20 illustrates an exemplary flat touch sensor pattern formed on a substrate in a "snail" pattern that can be applied to a curved surface according to some embodiments of this invention.

In another embodiment, the touch sensor array can be formed on a thermal plastic substrate material that can be reformed with heat. In this configuration the touch sensor array may be draped across a mold and then heated to form a curved touch sensor array shape. Alternatively, the substrate may be vacuum formed inside a cavity. The traces in the array, which may for example be made out of copper, may be made flexible enough to withstand this type of reshaping.

The curved or 3-d shaped touch sensor patterns may be placed under or over a curved substrate, for example, a glass or plastic cover. These touch sensors patterns can be used in a variety of multi-touch devices, for example a multi-touch mouse, a personal computer touch pad, a media player, or mobile telephone.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A touch sensor array comprising:
at least one conducting layer forming touch sensor traces comprising a plurality of row traces and a plurality of column traces disposed in an active region of the touch sensor array;
a webbed ground plane having a webbed pattern disposed in at least the active area, wherein the webbed pattern:
has a plurality of openings aligned with respect to the touch sensor traces,
is grounded, and
is distinct from the at least one conducting layer;
a routing layer, distinct from the at least one conducting layer forming the touch sensor traces, the routing layer having routing lines aligned with respect to the active region of the touch sensor array, the routing lines disposed with respect to the webbed pattern such that the routing lines follow the webbed pattern, the routing layer distinct from the webbed ground plane; and
wherein the webbed ground plane is disposed between the routing layer and the at least one conducting layer and shields the touch sensor traces from the routing lines.

2. The touch sensor array of claim 1, wherein the at least one conducting layer comprises a first conducting layer having one of the plurality of row traces or the plurality of column traces disposed thereon and a second conducting layer having the other of the plurality of row traces or the plurality of column traces disposed thereon.

3. The touch sensor array of claim 1, wherein the plurality of row traces or the plurality of column traces have a comb pattern.

4. The touch sensor array of claim 1, wherein the at least one conducting layer comprises a first layer and wherein one of the plurality of row traces and the plurality of column traces are arranged on the first layer in pairs of opposing and spaced apart comb pattern configurations having opposing fingers facing one another; and
the other of the plurality of row traces and the plurality of column traces arranged on the first layer and comprising cross elements substantially perpendicularly disposed with respect to the opposing fingers of the comb pattern configurations.

5. The touch sensor array of claim 4, wherein the other of the plurality of row traces and the plurality of column traces further has a plurality of conductors arranged perpendicular to the cross elements.

6. The touch sensor array of claim 5, the cross elements being disposed between the spaced apart comb pattern configurations and the plurality of conductors being arranged perpendicular to the cross elements are disposed between and parallel to the opposing fingers of the comb pattern configurations; and
wherein the cross elements are continuous elements extending across the first layer of the touch sensor array.

7. The touch sensor array of claim 1, wherein the at least one conducting layer is a single conducting layer with the plurality of row and column traces disposed substantially on the single layer, and the single conducting layer has one or more vias routing ones of the column or row traces to at least one different layer.

8. The touch sensor array of claim 7, wherein the different layer is an insulating layer and the vias are positioned to prevent electrical contact between the column and row traces.

9. The touch sensor array of claim 7, wherein one of a plurality of row traces and a plurality of column traces are arranged in pairs of opposing and spaced apart comb pattern configurations having opposing fingers facing one another; and the other of the plurality of row traces and the plurality of column traces comprising cross elements arranged between the pairs of opposing fingers and substantially perpendicularly disposed with respect to the opposing fingers on the comb pattern configurations.

10. The touch sensor array of claim 9, wherein the other of the plurality of row traces and the plurality of column traces further has a plurality of conductors arranged perpendicular to the cross elements.

11. The touch sensor array of claim 10, wherein the conductors arranged perpendicular to the cross elements are disposed between and parallel to the opposing fingers of the comb pattern configurations; and wherein the cross elements are continuous elements extending across the single conducting layer of the touch sensor array.

12. The touch sensor array of claim 1, wherein the first conducting layer comprise conducting ink.

13. The touch sensor array of claim 1, wherein the array comprising one or more channels configured to allow the array to conform to a curved surface.

14. The touch sensor array as recited in claim 11, wherein the at least one different layer comprises the webbed ground plan having vias therein to prevent the routed ones of the column or row traces from coming in contact with the webbed ground plane.

15. The touch sensor array of claim 7, wherein the at least one different layer comprises the webbed ground plan having vias therein to prevent the routed ones of the column or row traces from coming in contact with the webbed ground plane.

16. The touch sensor array of claim 8, wherein the at least one different layer comprises the webbed ground plan having vias therein to prevent the routed ones of the column or row traces from coming in contact with the webbed ground plane.

17. The touch sensor array of claim 9, wherein each pair of opposing and spaced apart comb pattern configuration substantially overlaps one web opening.

18. A multi-touch mouse comprising a touch sensor array, the touch sensor array comprising:

at least one conducting layer forming touch sensor traces comprising a plurality of row traces and a plurality of column traces disposed in an active region of the touch sensor array;

a webbed ground plane having a webbed pattern disposed in at least the active area, wherein the webbed pattern:
has a plurality of openings aligned with respect to the touch sensor traces,
is grounded, and
is distinct from the at least one conducting layer;

a routing layer, distinct from the at least one conducting layer forming the touch sensor traces, the routing layer having routing lines aligned with respect to the active region of the touch sensor array, the routing lines disposed with respect to the webbed pattern such that the routing lines follow the webbed pattern, the routing layer distinct from the webbed ground plane; and wherein the webbed ground plane is disposed between the routing layer and the at least one conducting layer and shields the touch sensor traces from the routing lines.

19. The multi-touch mouse as recited in claim 18, wherein the one or more layers comprises a first layer and the mouse further comprises:

one of a plurality of row traces or column traces arranged on the first layer in pairs of opposing and spaced apart comb pattern configurations having opposing fingers facing one another; and the other of the plurality of row traces or column traces arranged on the first layer and comprising a plurality of cross elements substantially perpendicularly disposed with respect to the opposing fingers on the comb pattern configurations, with each cross element having perpendicularly disposed traces corresponding to the opposing fingers of the comb pattern configuration; and wherein the cross elements are continuous elements extending across the first layer of the sensor arrays.

20. A touch sensor array comprising:

a first conducting layer comprising a plurality of rows of row elements, a plurality of columns of column elements, and column traces that connect the plurality of columns of column elements;

a second conducting layer comprising one or more groups of row traces, each group having a plurality of row traces having a first portion that extends continuously along a column direction across plural rows of row elements and a second portion that extends along a row direction for connection to ones of the row elements within the plurality of rows, each first portion overlying row elements on the first conducting layer such that the row elements of the first conducting layer shield the first conducting layer from the first portions; and one or more channels disposed in the first and second conducting layers and extending from a periphery portion of the array to a predetermined distance toward, but not extending to, the center of the array from the periphery portion.

21. The touch sensor array of claim 20, wherein the touch sensor array is configured for use on a curved surface.

22. The touch sensor array of claim 20, wherein the one or more channels are configured to allow the array to conform to a curved surface.

23. The touch sensor array of claim 20, wherein the plurality of row elements comprise row elements of different shapes and the plurality of column elements comprise column elements of different shapes.

24. The touch sensor array of claim 20, wherein the second conducting layer further comprises a ground plane.

25. A multi-touch mouse comprising a touch sensor array, the touch sensor array comprising:

a first conducting layer comprising a plurality of rows of row elements, a plurality of column elements, and column traces that connect the plurality of columns of column elements; and a second conducting layer comprising one or more groups of row traces, each group having a plurality of row traces having a first portion that extends continuously along a column direction across plural rows of row elements and a second portion that extends along a row direction for connection to ones of the elements within the plurality of rows, each first portion overlying row elements on the first conducting layer such that the row elements of the first conducting layer shield the first conducting layer from the first portions.

26. The multi-touch mouse of claim 25, wherein the touch sensor array is configured for use on a curved surface.

27. The multi-touch mouse of claim 25, wherein the array comprising one or more channels configured to allow the array to conform to a curved surface of the multi-touch mouse, the one or more channels extending from a periphery portion of the array to a predetermined distance toward, but not extending to, the center of the array from the periphery portion.

28. The multi-touch mouse of claim 25, wherein the plurality of row elements comprise row elements of different shapes and the plurality of column elements comprise column elements of different shapes.

29. The multi-touch mouse of claim 25 wherein the second conducting layer further comprises a ground plane.

* * * * *

UNITED STATES PATENT AND TRADEMARK OFFICE
CERTIFICATE OF CORRECTION

PATENT NO. : 8,629,841 B2
APPLICATION NO. : 12/242613
DATED : January 14, 2014
INVENTOR(S) : Degner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this
Thirtieth Day of May, 2017

Michelle K. Lee
*Director of the United States Patent and Trademark Office*